UNITED STATES PATENT OFFICE.

ARTHUR EARL HOULEHAN, OF WILMINGTON, DELAWARE, ASSIGNOR TO E. I. DU PONT DE NEMOURS AND COMPANY, OF WILMINGTON, DELAWARE, A CORPORATION OF DELAWARE.

PROCESS FOR THE PRODUCTION OF LOWER-BOILING HYDROCARBONS FROM HIGHER-BOILING HYDROCARBONS.

1,337,317. Specification of Letters Patent. Patented Apr. 20, 1920.

No Drawing. Application filed May 25, 1917. Serial No. 170,811.

*To all whom it may concern:*

Be it known that I, ARTHUR EARL HOULEHAN, of Wilmington, in the county of New Castle, and in the State of Delaware, have invented a certain new and useful Improvement in Processes for the Production of Lower-Boiling Hydrocarbons from Higher-Boiling Hydrocarbons, and do hereby declare that the following is a full, clear, and exact description thereof.

My invention relates particularly to a process for the production of lower boiling hydrocarbon from higher boiling hydrocarbon, and is applicable to the treatment and production of aromatic hydrocarbons as well as paraffin hydrocarbons. However, my invention is particularly applicable to the production of toluene from xylene or commercial xylene.

The object of my invention is to provide an improvement upon the process set forth in my application Serial No. 170,810 entitled A process for the manufacture of lower boiling hydrocarbons from higher boiling hydrocarbons, filed on even date herewith, by carrying out the process set forth therein with the aid of a vacuum, as by this means I obtain a higher yield of the lower boiling hydrocarbons, and eliminate certain difficulties in the operation of the process.

A further object of my invention is by this means to prevent the formation of higher boiling hydrocarbons. A further object is to avoid the plugging of the column and the condensers, inasmuch as at elevated temperatures the volatility of aluminum chlorid increases, whereas at a lower temperature if made available by the use of a decreased pressure the difficulty due to plugging is reduced.

While my invention is capable of being carried out in many different ways, for the purpose of illustration I shall describe only certain ways of carrying out the same.

For example, I may proceed as follows: Although all of the higher homologues are capable of being broken down to simpler bodies by treatment in accordance with my process, in order to obtain the best results I prefer the treatment of a certain fraction of the higher boiling hydrocarbons. Toluene can be obtained simply by mixing the hydrocarbon with the anhyrous aluminum chlorid and then distilling, but I have found that the best results are obtained in accordance with the details of my process described hereinafter. I prefer particularly a fraction which I will hereafter call "xylenes," and which consists principally of metaxylene. I have found that very high boiling oils retard the production of hydrocarbons in accordance with my process, and that they should preferably be absent. The fraction which I use and which I designate as the "xylenes" is the fraction obtained between 135° C. and 145° C., obtained by fractionating the ordinary solvent naphtha. To the xylenes thus obtained I add anhydrous aluminum chlorid in an amount equal to 5% to 20% of the xylenes, but, for the best results, I prefer to use from 5% to 10%. The anhydrous aluminum chlorid combines with a portion of the hydrocarbons either on warming or agitating in the cold forming a combination which is the active catalyst. This active catalyst is a reddish liquid and is not miscible with the hydrocarbons.

The mixture is then distilled either directly or by being heated for a short time with reflux condenser, then distilling the solvent, a certain amount of the toluene being thus obtained without following any specific conditions. I find that the best results are obtained, however, by using an efficient fractionating column and distilling under diminished pressure, for example 14 inches, first at quite a rapid rate until the temperature of the vapors reaches 100° C. The rate of distillation is then decreased, so that the temperature will not exceed 100° C. By this means I accomplish a removal of the toluene as fast as possible, and return the unchanged xylenes to the still to be further acted upon. When no more of the liquid will distil below 100° C., I allow the temperature to slowly rise. From 100° C. to 116° C., using a 14 inch vacuum, the distillation is maintained at a slow rate. During this distillation the toluene is formed continually, and the distillation is continued as slowly as it is found to be economical. When the temperature reaches 116° C. the rate of distillation can be increased, and the remainder of the distillation can be quite rapid. Such distillation serves to recover the unchanged xylenes and higher boiling hydrocarbons that have been formed during the reaction. When the temperature reaches 123° C., using a 14 inch vacuum, the fractionating column is preferably by-passed and the remainder of the solvent is distilled off directly. The distillation can be continued until coke is formed, in which case the solid is dug out, or it can be stopped at a point which will enable the residue to be run out as a liquid.

Throughout the distillation the process is preferably carried out under a reduced pressure, although the pressure employed depends upon the nature of the hydrocarbon being treated, and upon the product sought to be obtained. I have found that in treating xylenes with anhydrous aluminum chlorid and distilling under the conditions set forth in this application, by the use of about a 14-inch vacuum a higher yield of toluene is obtained, and the operating difficulties are greatly reduced.

While I have described my invention above in detail, I wish it to be understood that many changes may be made therein without departing from the spirit of my invention.

I claim:—

1. A process which comprises subjecting an aromatic hydrocarbon having a boiling point between 135–145° C. to a catalyst under such conditions as will produce a lower boiling hydrocarbon, and distilling off the latter under a vacuum during the course of the reaction.

2. A process which comprises subjecting the fraction of solvent naphtha boiling between 135–145° C. to anhydrous aluminum chlorid, under such conditions as will produce a lower boiling hydrocarbon and distilling off the latter under a vacuum during the course of the reaction.

3. A process which comprises subjecting xylene to a catalyst under such conditions as will produce toluene and distilling off the latter under a vacuum during the course of the reaction.

4. A process which comprises subjecting xylene to anhydrous aluminum chlorid, under such conditions as will produce toluene, and distilling off the latter under a vacuum during the course of the reaction.

5. A process which comprises subjecting an aromatic hydrocarbon having a boiling point between 135–145° C. to anhydrous aluminum chlorid under such conditions as will produce a lower boiling hydrocarbon and distilling off the latter under a vacuum during the course of the reaction in such a way as to return the greater part of the unchanged hydrocarbon to the still.

6. A process which comprises subjecting the fraction of solvent naphtha boiling between 135–145° C. to a catalyst under such conditions as will produce toluene and distilling off the latter under a vacuum during the course of the reaction in such a way as to return the greater part of the unchanged hydrocarbon to the still.

7. A process which comprises subjecting xylene to a catalyst under such conditions as will produce toluene and distilling off the latter under a vacuum during the course of the reaction in such a way as to return the greater part of the unchanged xylene to the still.

8. A process which comprises subjecting xylene to anhydrous aluminum chlorid under such conditions as will produce toluene and distilling off the latter under a vacuum during the course of the reaction in such a way as to return the greater part of the unchanged xylene to the still.

9. A process which comprises subjecting the fraction of solvent naphtha boiling between 135–145° C. to anhydrous aluminum chlorid under such conditions as will produce a lower boiling hydrocarbon and distilling off the latter under a vacuum during the course of the reaction in such a way as to return the greater part of the unchanged hydrocarbon to the still by means of a reflux condenser, the temperature being maintained for a time not above 100° C., and thereafter the temperature being slowly raised to 123° C.

10. A process which comprises subjecting the fraction of solvent naphtha boiling between 135–145° C. to a catalyst under such conditions as will produce toluene and distilling off the latter under a vacuum during the course of the reaction in such a way as to return the greater part of the unchanged hydrocarbon to the still by means of a reflux condenser, the temperature being maintained for a time not above 100° C., and thereafter the temperature being slowly raised to 123° C.

11. A process which comprises subjecting an aromatic hydrocarbon having a boiling point between 135–145° C. to anhydrous aluminum chlorid under such conditions as will produce toluene and distilling off the latter under a vacuum during the course of the reaction in such a way as to return the greater part of the unchanged hydrocarbon to the still by means of a reflux condenser, the temperature being maintained for a time not above 100° C., and thereafter the temperature being slowly raised to 123° C.

12. A process which comprises subjecting xylene to a catalyst under such conditions as will produce toluene and distilling off the latter under a vacuum during the course of the reaction in such a way as to return the greater part of the unchanged xylene to the still by means of a reflux condenser, the temperature being maintained for a time not above 100° C., and thereafter the temperature being slowly raised to 123° C.

13. A process which comprises subjecting xylene to anhydrous aluminum chlorid under such conditions as will produce toluene and distilling off the latter under a vacuum during the course of the reaction in such a was as to return the greater part of the unchanged xylene to the still by means of a reflux condenser, the temperature being maintained for a time not above 100° C., and thereafter the temperature being slowly raised to 123° C.

14. A process which comprises subjecting an aromatic hydrocarbon having a boiling point between 135-145° C. to anhydrous aluminum chlorid under such conditions as will produce a lower boiling hydrocarbon and distilling off the latter under a vacuum of 14 inches during the course of the reaction in such a way as to return the greater part of the unchanged hydrocarbon to the still.

15. A process comprising subjecting the fraction of solvent naphtha boiling between 135-145° C. to a catalyst under such conditions as will produce toluene and distilling off the latter under a vacuum of 14 inches during the course of the reaction in such a way as to return the greater part of the unchanged hydrocarbon to the still.

16. A process which comprises subjecting the fraction of solvent naphtha boiling between 135-145° C. to anhydrous aluminum chlorid under such conditions as will produce toluene and distilling off the latter under a vacuum of 14 inches during the course of the reaction in such a way as to return the greater part of the unchanged hydrocarbon to the still.

17. A process which comprises subjecting xylene to a catalyst under such conditions as will produce toluene and distilling off the latter under a vacuum of 14 inches during the course of the reaction in such a way as to return the greater part of the unchanged xylene to the still.

18. A process which comprises subjecting xylene to anhydrous aluminum chlorid under such conditions as will produce toluene and distilling off the latter under a vacuum of 14 inches during the course of the reaction in such a way as to return the greater part of the unchanged xylene to the still.

In testimony that I claim the foregoing I have hereunto set my hand.

ARTHUR EARL HOULEHAN.

Witnesses:
A. M. GORMAN,
P. E. STRICKLAND.